Feb. 1, 1966

NOBUHIKO SHIMASAKI 3,233,043

TIME-DIVISION MULTIPLEX TELEPHONE SWITCHING SYSTEM

Filed Feb. 7, 1962

2 Sheets-Sheet 1

INVENTOR.
NOBUHIKO SHIMASAKI

BY

Roy C. Hopgood

ATTORNEY

INVENTOR.
NOBUHIKO SHIMASAKI
BY
Roy C. Hopgood
ATTORNEY

United States Patent Office 3,233,043
Patented Feb. 1, 1966

1 2

3,233,043
TIME-DIVISION MULTIPLEX TELEPHONE SWITCHING SYSTEM

Nobuhiko Shimasaki, Tokyo, Japan, assignor to Nippon Electric Company, Limited, Tokyo, Japan, a corporation of Japan Filed Feb. 7, 1962, Ser. No. 171,684
Claims priority, application Japan, Feb. 10, 1961, 36/4,555
6 Claims. (Cl. 179—15)

This invention relates to time-division multiplex telecommunication networks, and particularly to speech networks in time-division telephone switching systems.

As those knowledgeable in the telephone art are aware, two wire type time-division switching systems have been developed in which a circuit is turned "ON" for a predetermined time period or slot so that bilateral transmission and reception of signal power may be produced. With conventional 2-wire switching systems, however, loss or attenuation of the signal in the switching network is encountered and accordingly it has been proposed that gain should be provided for the switching network and that pulse-width-modulation be applied to the highway. Such a system would be disadvantageous in that any trunk would then require a demodulation circuit and further, two time slots would be required for one connection between two subscriber circuits.

Accordingly, it is an object of this invention to provide a two wire time-division multiplex system in which a single time slot assignment is sufficient for achieving a connection or signal transfer between two engaged subscriber circuits.

One of the advantages of employing a system of this type is that the subscriber circuit is considerably simplified and another advantage is that the operating efficiency of the system is improved.

All of the objects, features and advantages of the invention will be best understood from a study of the following detailed description taken in conjunction with the claims and with the drawings in which:

Briefly, the invention includes a highway system and a plurality of subscriber circuits each connected to a telephone headset. Each of the subscriber circuits includes time-division switching means which also serve as a means for connecting each subscriber circuit to the highway system. The invention further includes a common amplifier circuit associated with each of two highways comprising the highway system, which provide amplification to compensate for signal attenuation in the overall arrangement. Each amplifier circuit also includes gating means for selectively connecting the input and output of each amplifier to the highway with which it is associated. These gating means are controlled by appropriate pulse trains which are synchronized with pulses applied to the subscriber circuits for turning the time division switching means "ON" and "OFF" in each of the subscriber circuits in a desired manner.

Figure 1:
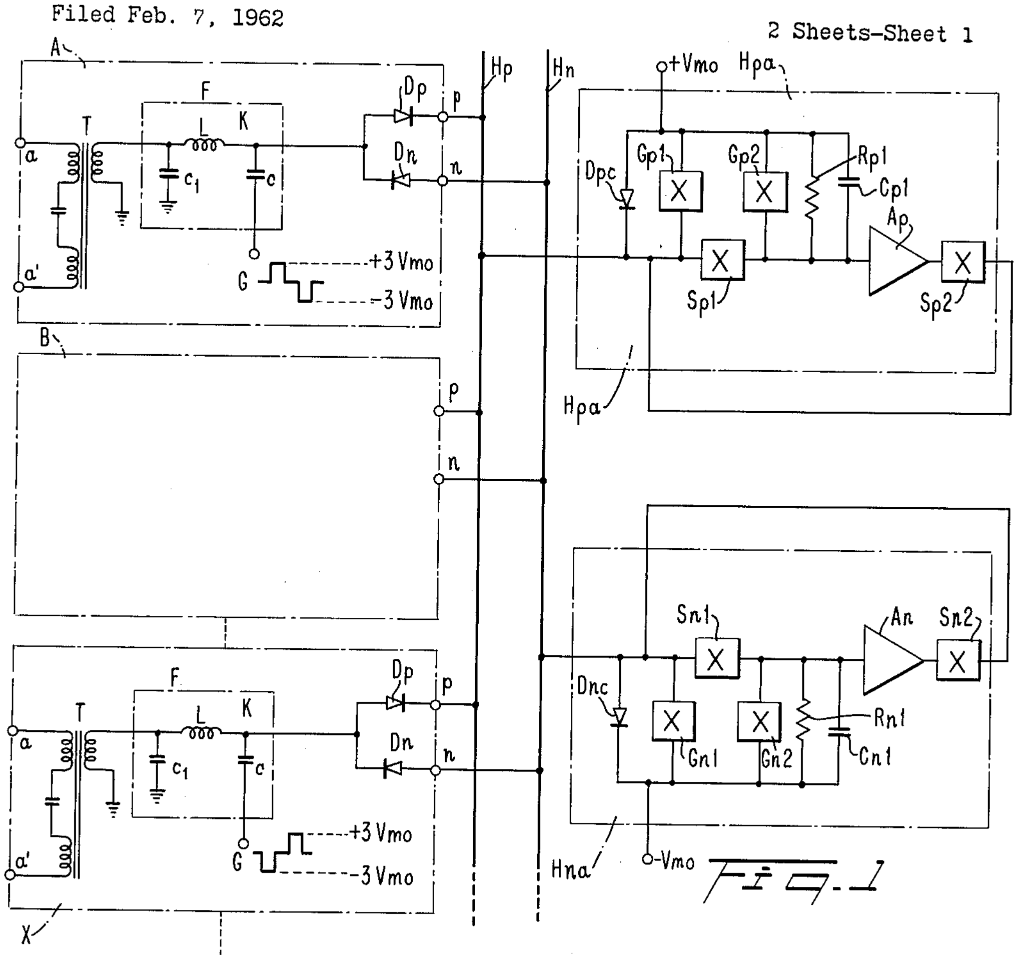
FIG. 1 shows a circuit embodying the principles of the present invention.

Referring now to FIG. 1, a highway system is provided which includes a highway $H_p$ for handling positive pulses and a similar highway $H_n$ for handling negative pulses. Blocks A, B . . . X . . . denote subscriber circuits. Each pair of terminals, *a–a'*, denote input and output terminals for continuous audio signals, to which a transducer in the form of a telephone set, for example, is connected. Terminals *p* and *n* are connected respectively to the highways $H_p$ and $H_n$. T denotes a transformer and F a low pass filter which serves as a buffer circuit between the audio signal from the terminals *a–a'* and a pulse signal applied to the terminal G. In this particular embodiment, the filter F comprises a series connected condenser C and inductance L, their junction forming the pulse signal terminal K. The action of the buffer circuit is the same as when it is used in the conventional 2 wire time division system. Thus by transmission of PAM signals through the highways, the sampling frequency component and the higher harmonic frequency components are produced on the highway side of the low pass filter or buffer circuit F. These components do not emerge, however, on the audio signal terminals *a–a'*, due to the high cutoff characteristics of the buffer circuit F. A more comprehensive explanation of the operation of this buffer circuit can be obtained from the treaties entitled "An Efficient Electronic Switch—the Bothway Gate" by J. A. T. French and D. J. Harding, P.O.E.E. Journal, April 1959, pp. 37–42.

Figure 4:
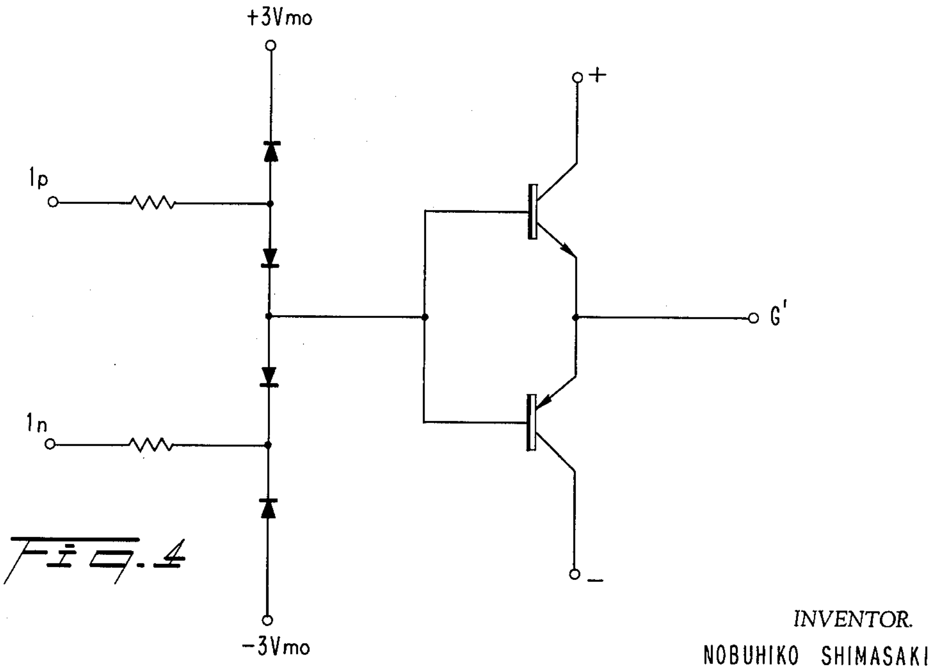

Diodes $D_p$ and $D_n$ are time-division switches, the anode of one and cathode of the other being connected to their common terminal K. A low output impedance circuit as shown in FIG. 4, for example, is connected to terminal G, detailed reference to this circuit being made hereinafter.

Blocks $H_{pa}$ and $H_{na}$ denote common amplifier circuits for connection respectively to the highways $H_p$ and $H_n$. Referring further to these common amplifier circuits, $A_p$ and $A_n$ denote pulse amplifiers; $S_{p1}$, $S_{n1}$, $S_{p2}$, and $S_{n2}$ denote gates for connecting the inputs and outputs of the pulse amplifiers to the highways; $G_{p1}$, $G_{n1}$, $G_{p2}$, and $G_{n2}$ denote clamping gates for providing a potential to the highways and input terminals of the pulse amplifiers in the absence of a signal applied to the corresponding highway; and $D_{pc}$ and $D_{nc}$ are clamping diodes. Condensers and resistances $C_{p1}$–$R_{p1}$, and $C_{n1}$–$R_{n1}$ comprise signal storage means in the input circuit of the pulse amplifiers $A_p$ and $A_n$ respectively.

Figure 2:
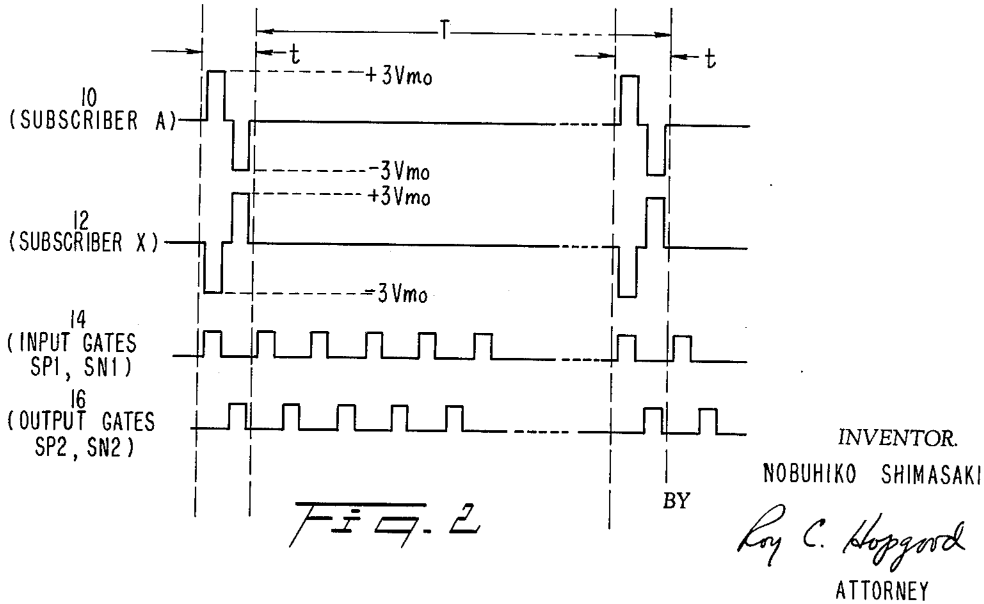
FIG. 2 illustrates various waveforms for explaining the operation of the circuit.

Reference is now made to FIG. 2 which shows the waveforms employed for proper operation of the circuit, the pulse waveform signals 10 and 12 being applied respectively to terminal G on subscriber circuit A and to terminal G on subscriber circuit X. It will be seen that these waveforms are produced during a given time slot having a duration of *t* seconds, each time slot occurring at intervals of T seconds. Further, the pulses within the first halves of the time slots of the waveform 10 are of opposite polarity to those in the first halves of the time slots of waveform 12. The information pattern for the time slots is stored in a memory circuit, not shown, by the operation of any suitable common control circuit. Such a memory circuit is conventionally employed in time division switching systems to assign predetermined time slots to pairs of subscriber circuits in telephone conversation through an appropriate group of gating circuits. The present embodiment differs from the conventional time-division switching system in that the grating pulse appearing at terminal G on each of the subscriber circuits A and X consists of two pulse components which are opposite in polarity to each other as illustrated in FIG. 2.

Pulse trains 14 and 16 in FIG. 2 indicate the actuating periods respectively for the gates $S_{p1}$ and $S_{n2}$ and the gates $S_{p2}$ and $S_{n2}$. Thus it will be seen that the gates $S_{p1}$ and $S_{n1}$ are turned "ON" in the first or former half periods of all time slots while gates $S_{p2}$ and $S_{n2}$ are turned "ON" in the latter half periods of all time slots. A guard time of suitable duration is of course provided between "ON" pulses of two adjacent time slots or between two "ON" pulses within the same time slot so that proper operation will result.

Now let the maximum levels of input and output audio signals be set to $V_m$ volts and the clamping levels of the highways $H_p$ and $H_n$ be set respectively to $+V_{mo}$ and $-V_{mo}$ volts at the connection point K in the subscriber circuit. Then, provided there is a relation such that $+V_{mo}>+V_m>O>-V_m>-V_{mo}$, each subscriber circuit will be electrically disconnected from the highways $H_p$ and $H_n$ in the absence of a pulse input to terminal G. In the first or former half period of a designated time slot, a pulse at a level of $+3V_{mo}$ is applied to terminal G in the subscriber circuit A and at the same time, a pulse at a level of $-3V_{mo}$ is applied to terminal G in the subscriber circuit X. Since, at the same instant, the gates $S_{p1}$ and $S_{n1}$ are turned "ON" (see pulse train 14), the input side of pulse amplifier $A_p$ is connected to the subscriber circuit A through the time-division switch $D_p$ while the input side of pulse amplifier $A_n$ is connected to the subscriber circuit X through the time-division switch $D_n$, with the result that the input signals for both subscriber circuits, which have been stored on condensers C, are transferred to condensers $C_{p1}$ and $C_{n1}$ in the common amplifier circuits $H_{pa}$ and $H_{na}$.

In the latter half period of a designated time slot, pulsed at levels of $-3V_{mo}$ and $+3V_{mo}$ are applied respectively to terminal G in the subscriber circuit A and terminal G in the subscriber circuit X. Since, at the same instant, gates $S_{p2}$ and $S_{n2}$ are turned "ON" (see pulse train 16), the output side of pulse amplifier $A_p$ is connected to the subscriber circuit X through the time-division switch $D_p$ while the output side of pulse amplifier $A_n$ is connected to the subscriber circuit A through the time-division switch $D_n$, with the result that the potential level at point K in the subscriber circuit A and that in the subscriber circuit X are exchanged within an assigned period of the time slot. The potential level at the output of each of the pulse amplifiers $A_p$ and $A_n$ must however be reduced by an amount corresponding to the value $V_{mo}$ so that the pulses appearing on the highways $H_p$ and $H_n$ may be converted to forms in which the sampled values of audio signals are respectively superimposed on $+2V_{mo}$ and $-2V_{mo}$. Any suitable means may be provided for this purpose, such as for example a voltage dividing network at the output of each of the amplifiers $A_p$ and $A_n$.

If a suitable gain is provided for both amplifiers $A_p$ and $A_n$ and the attenuation of the sampled value of audio signal due to losses such as might be encountered in the gate circuits is compensated, lossless transmission in either direction can be realized in the same manner as in the case of the 4-wire switch system. The potentials on the highways and the amplifier input circuits can be restored to the initial levels by turning "ON" the clamping gates $G_{p1}$, $G_{p2}$, $G_{n1}$, and $G_{n2}$ at the predetermined guard times by the use of circuits well known for the purpose.

Figure 3:
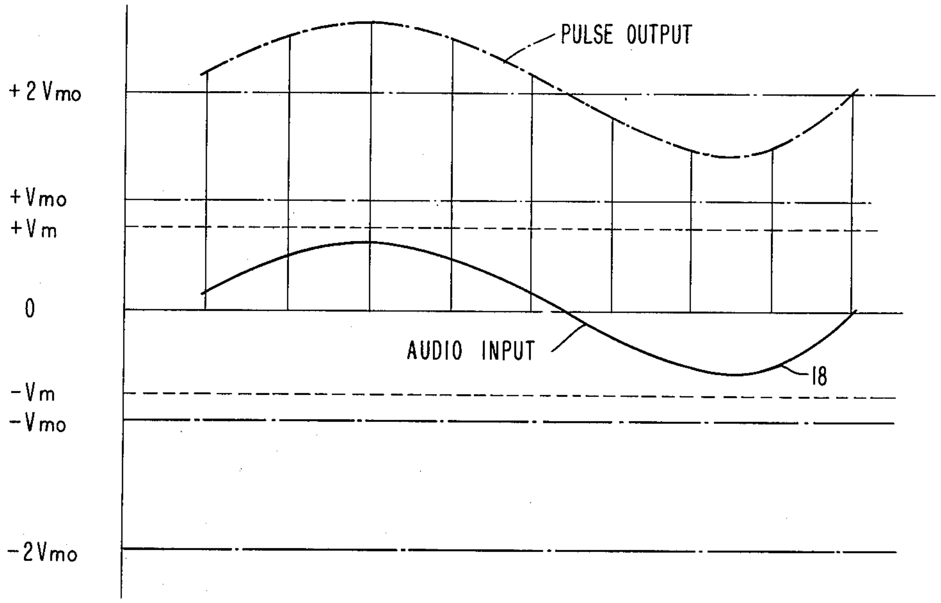
FIG. 3 illustrates an example of the relations of a signal waveform to the envelope of time-division sampling pulses and, FIG. 4 illustrates an example of one form of gating circuit which can be employed with FIG. 1.

FIG. 3 illustrates the relationship among the audio input signal 18, the output of pulse amplifier $A_p$ that has passed the gate $S_{p2}$, the maximum level of input and output audio signals, and the clamping level $V_{mo}$. Note that this diagram shows a case in which the phase of the sampled value of audio signal is not reversed after passage through the amplifier. Note also that if the level of the pulses applied to terminal G in the former half period of the time slot is $\pm2V_{mo}$ as seen in FIG. 3 rather than $\pm3V_{mo}$, it is then not necessary to make the output level of the amplifiers decrease by an amount equal to $V_{mo}$ with the result that the dynamic range of the highways is improved.

FIG. 4 shows one form of a circuit suitable for providing the waveforms 10 and 12 to the subscriber circuits A and X respectively. The terminal G' of FIG. 4 is of course connected to a terminal G of FIG. 1, each subscriber circuit being connected to a separate circuit such as that shown in FIG. 4. This circuit will produce waveforms of the type indicated by the numerals 10 and 12 in FIG. 2 when suitable potentials are applied to the various terminals in a manner well known in the art. If a time slot is assigned to each pair of engaged subscriber circuits, or to each combination of engaged subscriber and trunk circuits, or to each pair of engaged trunks in a time-division switching system, effective circuit connection will be accomplished during a time interval covering the assigned time period.

Assignment of the time slots is determined by a suitable connection control circuit in accordance with the progress of calls. For instance, the addresses of the subscriber circuits may be written in suitable delay line memories at the moments corresponding to the assigned time slots, and the address information is maintained in these delay line memories thereafter so long as the connection status remains unchanged. The outputs of the memory apparatus drive the circuits, for example, as shown in FIG. 4, which are provided for each subscriber, via a suitable pulse distributing circuit.

Descriptions and illustrations of details of a circuit for accomplishing reversal of the order of a plus-minus pulse supply to a pair of engaged calling and called subscriber circuits, and the contents of the aforementioned delay memories and the connection circuit are omitted herein for simplicity, since these circuits are already known to those skilled in the art.

According to the present invention, the construction of a multi-stage time-division switching network is achieved by coupling several stages of time-division switches to the highways in the same way as in a general time-division switching system. It is necessary in this case to design the switches so as to be turned "ON" over the entire designated time slots. It is convenient if the common amplifier circuits are installed at any desirable stage (for example, only at a link stage having the highest operating efficiency).

A detailed description of the basic structures of time-division switching systems is omitted herein. Information on such systems, however, is available in the following treatise: "Time Sharing as a Basis for Electronic Switching—A Switching Highway System," by L. R. F. Harris, P.I.E.E., part B, November 1956, pp. 722–742. This treatise is mainly concerned with four-wire systems. A general description of two-wire systems appears in the following literature: "Electronic Telephone Exchanges," by G. Svala and W. Jacob, Ericsson Review 33, 1 (1956).

Although the description of the invention has been carried out with reference to one specific embodiment, it will be appreciated that the essence of the invention resides in that it provides a time-division switching system capable of gain compensation by installing amplifiers, as in the conventional 4-wire switching system, characterised however in that it comprises two time-division switches or gates ($D_p$ and $D_n$ in the present embodiment) installed in each subscriber conversion circuit which is similar to that in the conventional 2-wire switching system for connection to the highways, and means for turning "ON" alternately the gates in the former and the latter periods of a designated time slot, one after the other, against two subscriber conversion circuits that have been connected correspondingly.

It will be appreciated that the diodes $D_p$ and $D_n$ have been used in the description as the time-division switches merely by way of example and that various equivalent devices may be employed in lieu thereof.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

I claim:

1. A time-division multiplex switching system comprising a pair of time-division subscriber circuits, each of said circuits having a first pair of conductors connected to a different transducer, each of said circuits also having a second pair of conductors, said subscriber circuits each including buffer means coupled to said first pair of conductors, said subscriber circuits each further including a pair of time-division switches connected to said buffer, one of said time-division switches also being connected to one of said second pair of conductors and the other of said time-division switches being connected to the other of said second pair, a pair of highways, one of said highways being connected to one of said second pair of conductors and the other of said highways being connected to the other of said second pair, a first amplifier and a second amplifier, each of said amplifiers having its input connected to a different one of said highways through a different first gating means and its output connected to the same highway through a different second gating means, first signal storage means connected between the input of one amplifier and a terminal of positive potential, second signal storage means connected between the input of the other amplifier and a terminal of negative potential, and means for actuating one of said time-division switches in each of said subscriber circuits and both of said first gating means during one half of a given time slot, and for actuating the other of said time-division switches in each of said subscriber circuits and both of said second gating means during the other half of said given time slot.

2. The invention as recited in claim 1 wherein said actuating means includes pulse waveforms applied to each of said subscriber circuits and pulse trains applied to each of said first gating means and each of said second gating means.

3. The invention as recited in claim 1 which further includes clamping diodes connected to each of said highways and clamping gates connected to the input circuits of each of said amplifiers for restoring the potentials on said highways to predetermined values during operation.

4. The invention as recited in claim 1 wherein said signal storage means comprises a parallel connected resistance capacitance combination and said buffer means includes an inductance and a capacitance connected in series.

5. The invention as recited in claim 1 wherein said time-division switches comprise a pair of diodes connected in series between said second pair of conductors, the anode of one diode being connected to the cathode of the other diode.

6. A time-division multiplex switching system comprising a pair of time-division subscriber circuits, means for connecting a telephone set to each of said circuits, said circuits each further including a first diode and a second diode connected together in front-to-back relationship, a filter coupled between said telephone set and the connection between said first and second diodes in each of said circuits, a first highway connecting like terminals of said first diodes in each of said circuits together and a second highway connecting like terminals of said second diodes in each of said circuits together, first and second amplifiers each having its input connected respectively to said first and second highways through a first gating means in each circuit, said first and second amplifiers further having their outputs connected respectively to said first and second highways through a second gating means in each circuit, means for closing both of said first gating means simultaneously when said second gating means are open, means for closing both of said second gating means when said first gating means are open, a first parallel-connected resistance-capacitance network connected between the input of one of said amplifiers and a terminal of positive potential, a second parallel-connected resistance-capacitance network connected between the input of the other of said amplifiers and a terminal of negative potential, and means for applying pulses of opposed polarity simultaneously to said subscriber circuits during the first half of a given time period for switching on said first diode in one subscriber circuit and said second diode in the other subscriber circuit while said first gating means are closed, said last mentioned means also applying pulses of opposed polarity simultaneously to said subscriber circuits during the second half of said time period for switching on the other diodes in each subscriber circuit while said second gating means are closed, the pulses applied to the same subscriber circuit during the first and second halves of said time period being also of opposite polarity with respect to each other.

References Cited by the Examiner

UNITED STATES PATENTS

| | | | |
|---|---|---|---|
| 1,128,279 | 2/1915 | Arnold | 179—170 |
| 2,962,551 | 11/1960 | Johannesen | 179—15 |
| 3,027,524 | 3/1962 | May | 333—7 |
| 3,060,267 | 10/1962 | Feder | 333—7 |

DAVID G. REDINBAUGH, *Primary Examiner.*